United States Patent Office 3,440,089
Patented Apr. 22, 1969

3,440,089
ELECTROSTATIC DUPLICATION PAPER
Floyd L. Edris, Pottstown, Pa., assignor to The Firestone Tire & Rubber Company, Akron, Ohio, a corporation of Ohio
No Drawing. Original application Oct. 23, 1965, Ser. No. 504,086, now Patent No. 3,291,766, dated Dec. 13, 1966. Divided and this application Apr. 19, 1966, Ser. No. 543,542
Int. Cl. G03g 7/00; B32b 33/00, 27/10
U.S. Cl. 117—155    5 Claims This application is a division of my pending application Ser. No. 504,086, filed Oct. 23, 1965, and now Patent No. 3,291,766, which in turn, is a continuation-in-part of application Ser. No. 269,154, filed Mar. 29, 1963, now abandoned.

This invention relates to the preparation of polymers of shellac with conjugated diolefins alone, or with monovinyl aromatic compounds and to the latexes so produced. In particular, it relates to novel butadiene-styrene-shellac latexes.

It has been known that shellac easily interpolymerizes with acrylic monomers in aqueous dispersions to form stable latexes without the use of any surfactant. In such latexes the shellac itself acts as the emulsifier. The acrylic-shellac polymers produced in this manner are characterized by a number of useful characteristics including improved adhesion to many substrates and are readily adapted to the production of films having excellent water resistance.

In contract to the ease of incorporation of shellac in acrylic polymers, great difficulty has been encountered heretofore in incorporating shellac into styrene-containing polymers. Thus, in U.S. 2,961,420, where interpolymers of styrene and shellac are disclosed, it is also set forth that such interpolymers contain only from about 10–30% by weight of the shellac chemically incorporated into the polymer, the rest being present as free shellac. In addition, U.S. 2,961,420 teaches that a surfactant (a nonionic) should be used with the shellac to produce the requisite stability desired in the latex.

It is an object of this invention to provide a novel duplication paper possessing an interpolymer of shellac.

It is another object of this invention to provide a duplication paper having superior characteristics for electrostatic duplication processes.

These and other objects are attained by effecting polymerization in an aqueous emulsion of a reactant charge comprising at least about 18% by weight of a conjugated diolefin, up to about 75% by weight of a monovinyl aromatic compound and from about 2 to 30% by weight of solubilized shellac. The solubilized shellac, prior to polymerization, is in solution in the aqueous medium which has a pH in the range of from about 6.5 to 8.3 and preferably from about 7.0 to 7.8. No supplemental surfactant, emulsifier or shellac stabilizer is employed.

Latexes produced in accordance with the present invention contain solids in which about 90% by weight of the shellac is chemically bound as an integral part of an interpolymer, i.e., no more than about 10% of the latex solids is methanol soluble. The latexes are further characterized as clear and self-supporting at room temperature, exhibit excellent adhesion, resistance to water and salt solutions and excellent electrical properties.

The conjugated diolefins used in this invention are butadiene-1,3, isoprene, chloroprene, pentadiene-1,3, piperylene and mixtures thereof. The conjugated diolefin may be separately polymerized with the shellac, or an admixture of the vinyl aromatic compound and the conjugated diolefin in the proportions desired may be copolymerized with the shellac.

The vinyl aromatic compounds used in this invention are styrene, alpha-methyl styrene, alpha-chlorostyrene and the corresponding halo, nitro, and methyl nuclear substituted derivatives thereof such as the vinyl toluenes, p-chlorostyrene, p-nitrostyrene, etc. Mixtures of the vinyl aromatic compounds may be used.

Optionally, minor amounts of copolymerizable vinyl or vinylidene monomers may be substituted for the conjugated diolefin portion of the polymerization charge. Up to about two-thirds of the diolefin charge may be replaced by such vinyl or vinylidene monomers but should comprise no more than about 25% by weight of the total monomer charge. Examples of such vinyl or vinylidene monomers are methyl isopropenyl ketone, divinyl benzene, vinylidene chloride, acrylonitrile, acrylamide, alkyl acrylates such as butyl acrylate, alkyl methacrylates such as methyl methacrylate, etc. Such monomers should, of course, be selected to insure that they do not react deleteriously with other components of the latex. Divinyl benzene, in many respects, acts like, and has often been treated by the art, as an equivalent of a conjugated diolefin. As a result, divinyl benzene can generally be included in the polymerization charge in somewhat greater quantities than the other vinyl and vinylidene monomers. It should not, however, replace more than two-thirds of the conjugated diolefin in the polymerization charge.

In accordance with the invention the shellac is dissolved in an aqueous alkaline medium and the polymerization is effected in the presence of this solution, e.g., by adding the monomer charge thereto, together with the polymerization catalyst and initiator. In preparing the aqueous shellac solution, the shellac may be mixed into the water which is then made alkaline by the addition of a suitable base such as ammonium hydroxide, borax or an amine such as diethanolamine, morpholine, etc. Heating may be used to aid in the solution. Where the interpolymer produced is to be used for electrostatic printing, it has been found that ammonium hydroxide or borax should be used for the solubilization.

Any commercial grade of shellac may be used. Some grades such as orange shellac produce color and/or cloudiness in the polymer. The physical properties of latexes produced with such shellacs are satisfactory, but because of the color their use is generally restricted to applications where this is not critical. It is preferred to use a refined shellac, i.e., a shellac which has been both bleached and dewaxed.

As polymerization catalyst, there may be used one or more free radical catalysts such as azobisbutyronitrile, methyl ethyl ketone peroxide, benzoyl peroxide, t-butyl hydroperoxide, cumene hydroperoxide, ammonium, sodium or potassium persulfate, etc. If desired, the free radical catalyst may be activated by a suitable redox system as known to those skilled in the art.

The temperature of polymerization is not critical and any of the temperatures commonly used in the art for the emulsion polymerization of these monomers may be used. Generally, polymerization will be carried out at a temperature of from about 15° C. to about 100° C. and preferably between about 40° C. and 80° C. The polymerization may be carried out batchwise or continuously. The polymerization reactants, e.g., the monomers, may be charged to the polymerization vessel intermittently or continuously as the polymerization proceeds or the entire charge may be added to the vessel prior to the initiation of polymerization. Additional catalyst or redox material may also be added to the system as the polymerization proceeds.

It is essential in obtaining the highly stable latexes without the use of an emulsifying agent and in which the shellac is chemically bound in the interpolymer, that the pH of the emulsion prior to initiation of polymerization be no higher than about 8.3. At higher pH values, serious floccing occurs. At a pH below about 7, the polymerization itself proceeds satisfactorily, but at such pH's the solubilization of the shellac is incomplete so that free shellac is present in the system and results in films having reduced clarity and other undesirable properties. To obtain efficient dispersing action, there must be about 2% by weight of shellac based on the monomers. No significant improvement in physical properties has been noted with more than about 10% by weight of shellac based on the weight of the monomers. Accordingly, the use of larger amounts of shellac will be dictated generally by commercial considerations. It is preferred not to use more than about 30% shellac by weight. The preferred amount of shellac is from about 5–15% by weight.

The following examples are given in illustration of the invention and are not intended as limitations thereon. All parts are by weight unless otherwise stated.

EXAMPLE 1

A polymerization vessel was charged with 8 parts shellac, 0.8 part concentrated ammonia and 150 parts water. The mixture was heated to 70° C. with agitation to effect solution of the shellac. Then 25 parts butadiene, 67 parts styrene and 0.1 part potassium persulfate were added and the batch polymerized at 65° C. The polymerization was completed after 20 hours. The pH at the start of polymerization was 7.8. The finished latex had a pH of 6.0. Additional ammonia was added to the finished latex to adjust the pH to 9.5. The floc was 0.1%.

A control latex was prepared using the same monomer ratio but with 5% of a nonionic emulsifier instead of shellac. The emulsifier was an ethoxylated fatty alcohol commercially available under the trade name Alkanol N.C. To the finished polymer latex were then added dissolved shellac to give the same shellac concentration as in the example. A series of films was then cast from both latexes. The films were cured by baking at 150° C. for 5 minutes. The properties of the films are set forth in the following table:

|  | Tensile (p.s.i.) | Elongation (percent) |
| --- | --- | --- |
| Example 1 | 1,631 | 225 |
|  | 1,754 | 225 |
|  | 1,714 | 225 |
| Control | 1,240 | 300 |
|  | 1,327 | 300 |
|  | 1,127 | 280 |

In this and the succeeding examples a bleached and dewaxed shellac was used unless otherwise specified.

EXAMPLES 2 THROUGH 6

A series of 5 latexes was prepared using the recipe of Example 1, but varying the amount of ammonia to adjust the pH at the start of polymerization. The pH of the different latexes and the amount of floc obtained are set forth in the following table:

| Example | pH | Floc |
| --- | --- | --- |
| 2 | 6.5 | 0.5 |
| 3 | 6.8 | 0.1 |
| 4 | 7.3 | 0.1 |
| 5 | 8.3 | 1 |
| 6 | 8.5 | 25 |

The latex of Example 2 had fine particle size and excellent mechanical stability. However, films cast from the latex were slightly cloudy showing some undissolved shellac.

EXAMPLES 7 THROUGH 15

A series of 9 latexes was prepared using the recipe of Example 1, except that the amount of shellac was 2, 3, 4, 5, 6, 7, 8, 9 and 10%, respectively, in the examples. In each case, 30 parts of butadiene and 70 parts of styrene were used. In each case, a latex having fine particle size and low floc was obtained. The latexes of Examples 10–13 containing from 5 to 8% shellac displayed a relatively high viscosity (i.e., above 1000 cps. Brookfield viscosity) during the polymerization. Upon adjustment of the pH to 9.5 after polymerization, the viscosity was markedly reduced. Films were cast on a glass base from each of the latexes. All the films displayed excellent adhesion and tensile strength. There was an improvement in the clarity of the film as the amount of shellac increased from 2% to 10%. The latex of Example 7 had acceptable mechanical stability while the remaining latexes had excellent mechanical stability. The latex solids of each example were then extracted with methanol to determine the amount of free shellac, i.e., the amount of shellac not chemically bound in the interpolymer. Although the amount of shellac varied from 2% to 10%, the amount of the methanol-soluble extract stayed at about 10% of the shellac in each example.

EXAMPLE 16

A latex was prepared according to the recipe of Example 1, except that alpha-methyl styrene was substituted for the styrene. The resulting latex had a fine particle size, excellent mechanical stability, and low floc (i.e., less than about 1%).

EXAMPLE 17

A latex was prepared according to the recipe of Example 1, except that vinyl toluene was substituted for the styrene. The vinyl toluene was a mixture of the ortho, meta and para isomers. The resulting latex had a fine particle size, excellent mechanical stability and low floc.

EXAMPLE 18

A latex was prepared according to the recipe of Example 1, except that the monomer charge consisted of 59 parts of styrene, 16 parts of butadiene and 25 parts of acrylonitrile. The resulting latex had a fine particle size, excellent mechanical stability and low floc.

EXAMPLE 19

A latex was prepared using the recipe of Example 1, except that the monomer charge consisted of 65 parts styrene, 30 parts butadiene and 5 parts divinyl benzene. Films cast from this latex were more brittle than films cast from the latex of Example 1. Further, infrared analysis showed a decrease in the unsaturation of such latexes as compared to the latex of Example 1. The latex itself had a fine particle size, excellent mechanical stability and low floc. The latex had a higher finished viscosity than a similar latex omitting the divinyl benzene.

EXAMPLE 20

A latex was prepared using the recipe of Example 1, except that diethanolamine was substituted for the ammonia in solubilizing the shellac and for adjusting the pH of the emulsion at the start of the polymerization. The latex had a fine particle size, excellent mechanical stability and low floc. Films cast from the latex on a glass substrate had excellent adhesion, tensile strength and clarify.

EXAMPLE 21

A latex was prepared according to the recipe of Example 1, except that 0.2 part of benzoyl peroxide was substituted for the potassium persulfate catalyst. The latex had a fine particle size, excellent mechanical stability and low floc.

EXAMPLE 22

A latex was prepared according to the recipe of Example 1, except that 0.2 part of azobisbutyronitrile was substituted for the potassium persulfate as the catalyst. The latex had a fine particle size, excellent mechanical stability and low floc.

EXAMPLES 23 THROUGH 33

A series of 11 latexes was prepared according to the recipe of Example 1, except that the ratio of butadiene and styrene was varied in 10% amounts from 100% styrene to 100% butadiene. The latexes containing more than 40% butadiene gave films having low tensile strength. The latexes containing less than 20% butadiene (18% based on total charge of styrene, butadiene, and shellac) also had poor film-forming properties. The latexes having a high butadiene content, i.e., 70%, had a high viscosity.

EXAMPLE 34

A solution of 10 parts shellac in 165 parts of water and 1.1 parts of concentrated ammonium hydroxide was prepared as in Example 1. There were then added 0.1 part potassium persulfate, 70 parts styrene and 30 parts butadiene and the mixture polymerized at 65° C. for 18 hours at which time polymerization was complete. The latex had fine particle size, excellent mechanical stability and low floc. Unpigmented films cast from the latex had excellent adhesion to steel, aluminum, glass and tinplate. The films had excellent resistance to alkalis as shown by two weeks' exposure to 50% aqueous sodium hydroxide. After two weeks' exposure to concentrated hydrochloric acid, the film showed only a blush. After two days' contact with concentrated nitric acid, the film was discolored and swollen. Methanol caused only blushing showing that the shellac is almost all chemically bound in the interpolymer. Toluene and butyl acetate caused swelling while mineral spirits made the material brittle. Films cast from the latex had excellent clarity and after 14 days at 180° C. showed only slight yellowing.

An unpigmented film cast on a steel panel was then tested for salt spray resistance using ASTM B117 Salt Spray Fog Test. For comparison there were also tested:

(a) A commercial polyvinyl chloride copolymer latex plasticized with di-2-ethylhexyl phthalate so that films from the latex combine excellent tensile strength and abrasion resistance with excellent flexibility;

(b) A commercial butadiene-styrene (39/61) latex available under the trade name PL-14; and (c) A commercial rosin-modified butadiene-styrene latex specially formulated for protecting steel and available under the trade name PL-30.

The resin in (a) failed after 100 hours, the resin in (b) failed after 150 hours and the resin in (c) failed after 250–300 hours. In contrast, the films from the resin in the instant latex had not failed after 500 hours when the test was discontinued.

A pigment master batch was prepared using the following materials:

| | |
|---|---|
| $CaCO_3$ | 40 |
| Clay | 20 |
| $TiO_2$ | 40 |
| Anionic emulsifier | 15 |
| Defoamer | 1 |
| Water | 43 |

Two paints were then formulated using the pigment master batch and the latex of the example. The one paint contained 30% pigment volume, the other 40% pigment volume. Cedar panels were then given three coats of the two paints, the latex paints serving as the primer as well as the top coat. Two other cedar panels were first primed using a commercial oil-base primer (a linseed oil alkyd obtained from the Sherwin-Williams Co. under the trade name A-100) and then two top coats of the latex applied, each latex being used with a different panel. After 500 hours in a weatherometer all panels showed slight but equal cracking. The oil-primed panels showed more discoloration than the self-primed panels.

EXAMPLE 35

A solution of 10 parts shellac in 165 parts of water, 1.7 parts $Na_2B_4O_7 \cdot 10H_2O$ and 0.5 part $NaBO_3 \cdot 4H_2O$ was prepared as in Example 1. There were then added 0.1 part potassium persulfate, 70 parts styrene and 30 parts butadiene and the mixture polymerized at 65° C. for 18 hours at which time polymerization was complete. The latex had fine particle size, excellent mechanical stability and low floc. It was also compatible with reactive pigments such as zinc oxide.

Using the latexes of Examples 34 and 35, films of unpigmented resin were cast on a paper backing. The resulting films retained an electrostatic charge. Further, when the electrostatic charge was deposited on the film in image configuration, there was no spreading or blurring of the image so that the image could be developed by conventional methods to yield clear, sharp visible images. Thus, paper coated with the latex was eminently suitable for use in electrostatic printing processes as disclosed for example, in U.S. 3,068,481 to Schwertz.

EXAMPLES 36 THROUGH 38

Three latexes were prepared using the recipe of Example 35 except that 10, 15 and 20 parts of shellac were used in Examples 36 through 38, respectively. In all examples 1.26 parts of borax and 0.46 part of sodium borate were used to solubilize the shellac. The latexes had fine particle size, excellent mechanical stability and low floc. In Example 37 the latex had a viscosity of 105 c.p.s. after polymerization which dropped to 23 c.p.s. upon adjusting the pH to 9.5. In Example 38 the viscosity was 35 c.p.s. after polymerization and dropped to 15 c.p.s. after adjusting the pH to 9.5. In contrast, in Example 36 the viscosity was 2750 c.p.s. after polymerization, dropping to 30 c.p.s. upon adjusting the pH to 9.5.

EXAMPLE 39

A latex was prepared using the recipe of Example 34, except that 0.1 part of sodium metabisulfite was added. The polymerization rate was increased to 90% conversion in 4 hours. The latex had fine particle size, excellent mechanical stability and low floc.

EXAMPLE 40

A latex was prepared using the recipe of Example 34, except that the monomer charged consisted of 100 parts butadiene. At the completion of the polymerization 1/10 of the latex containing 16 parts of an interpolymer of butadiene and shellac was taken and to this charge was added 59 parts of styrene and 25 parts of acrylonitrile. Additional water was then added to give a total solids content of 40% and the mixture reheated to 65° C. for 16 hours without any additional catalyst or emulsifying agent. At the end of this time a graft polymer of the ABS type was obtained with the styrene and acrylonitrile being grafted on to the butadiene-shellac base.

EXAMPLE 41

A latex was prepared according to the recipe of Example 34, except that the monomer charge was 100 parts styrene. One part of the resulting latex was then blended with 2 parts of the latex of Example 1. The resulting latex had a total styrene content of 73.2 parts, a butadiene content of 17.2 parts and a shellac content of 8.6 parts. Unpigmented films were then cast from the resulting latex mixture and from the latex of Example 34. The film of the latex mixture had excellent tensile strength and clarity and displayed no blocking. In contrast, the film of Example 34, while having excellent tensile strength, had significantly higher blocking.

EXAMPLES 42 THROUGH 44

A series of three latexes was prepared according to the recipe of Example 34. At the conclusion of the polymerization, 3 parts of a commercial emulsifying agent were added to each latex. To Example 42 were added 3 parts of a commercial ethoxylated nonylphenol; to Example 43 were added 3 parts of a commercial alkyl-aryl sulfonate; and to Example 44 were added 3 parts of an ethoxylated fatty alcohol. Films were then cast from each of these latexes. The resulting films had poor electrostatic properties.

Latexes produced according to this invention which are high in diolefin content are particularly suitable for use as pressure-sensitive adhesives. Thus, a latex prepared using 75 parts of butadiene, 25 parts of styrene, and 10 parts of shellac is eminently suited for this application.

The solids content of the latexes of the invention is not critical. In general, where shellac is used as the sole emulsifier, the solids content should not be higher than about 40% by weight. A shellac content in the latex of between about 5–15% is particularly preferred in preparing latexes according to the instant invention. At higher concentrations of shellac, it has been found that the choice of solubilizing agent and the pH range become more critical in producing desirable latexes. At such high shellac loadings, solubilization of the shellac by borax and the use of a slightly lower pH, i.e., from about 6.5 to 7.5, has been found desirable, though these factors will vary wih the type of shellac used. The amount and nature of the viscosity peak shown in Examples 7–15 will also vary with these factors, i.e., with the pH, type of shellac and type of solubilizing agent. While in general it is desirable that the shellac be solubilized prior to initiating polymerization, this is not essential and polymerization can actually be initiated prior to complete solution of the shellac. There is a slight increase in pre-floc under these conditions, but otherwise the latexes produced are in every way satisfactory.

Thus, by the process of the present invention, polymers can be produced containing from about 2 to 30% by weight of solubilized shellac, up to about 75% by weight of a monovinyl aromatic monomer and at least 18% of a conjugated diolefin, up to two-thirds of which may be replaced by a vinyl monomer or a vinylidene monomer provided the total of the vinyl and vinylidene monomers does not exceed 25% of the total polymer. These polymers are excellent for the production of clear, self-supporting films, particularly when the monovinyl aromatic monomer is styrene, alpha-methyl styrene or vinyl toluene. The most outstanding product is obtained with butadiene-1,3 as the conjugated diolefin, particularly in combination with styrene as the monovinyl aromatic monomer. Insofar as the quantities of the components are concerned, the most outstanding product is obtained when the monovinyl aromatic monomer to diolefin monomer ratio is in the range of about 1.5:1 to about 4:1. As was discussed previously, aqueous latex dispersions produced in accordance with the present invention, contain a maximum of about 10% of the shellac in methanol extractable form. In the polymers, films and aqueous latex dispersions, 5 to 15% of the solubilized shellac provides best results.

The products produced by the instant invention possess a combination of highly unusual and unexpected properties. Thus, the polymers produced are living polymers and may be used as the base for grafting on other polymers. Thus, as shown in Example 40, such grafting may be carried out without any additional catalyst or emulsifier. In addition, as compared to the shellac-styrene interpolymers disclosed in U.S. 2,961,420, the interpolymers of the invention have an extremely large amount of shellac chemically bound in the interpolymer and it is believed that the properties possessed by the products of the invention are in large part due to this unique structure. In addition, the polymers so produced have outstanding resistance to salt spray, and a highly unusual ability in formulating coatings for use in electrostatic printing processes. Also highly unusual is the ability of the latexes of the invention to be used as a primer coat for raw wood. It is obvious that many variations may be made in the products and processes of this invention and it is not intended to be limited to the specific embodiments set forth herein. Thus, the polymers of the invention may be used as tire cord adhesives, etc. Further, the polymers containing a conjugated diolefin may be cured with sulfur, peroxide and resin curing agents, etc., to produce new and useful compositions which are useful in tire carcasses, etc.

What is claimed is:

1. As an article of manufacture, duplication paper for use in electrostatic printing processes comprising a paper substrate coated with a continuous film of a polymer consisting essentially of
   (a) from about 5 to 15% by weight of solubilized shellac;
   (b) up to about 75% by weight of monovinyl aromatic monomer;
   (c) up to 25% of a member selected from the group consisting of aliphatic monovinyl monomers, aliphatic monovinylidene monomers and divinyl benzene, and
   (d) the balance comprising conjugated diolefin monomer,
   the aggregate amount of (c) comprising less than about twice the diolefin monomer content of said polymer, the aggregate of (c) and (d) in said polymer comprising at least 18% by weight of said polymer.

2. An article in accordance with claim 1 in which said polymer consists essentially of shellac, styrene and butadiene-1,3.

3. An article in accordance with claim 2 in which the ratio of styrene to butadiene-1,3 is in the range of about 1.5 to about 4.

4. An article in accordance with claim 1 in which said polymer consists essentially of shellac, alpha-methyl styrene and butadiene-1,3.

5. An article in accordance with claim 4 in which the ratio of alpha-methyl styrene to butadiene-1,3 is in the range of about 1.5 to about 4.

References Cited

UNITED STATES PATENTS

| | | | |
|---|---|---|---|
| 2,630,426 | 3/1953 | Uraneck et al. | 260—83.7 |
| 2,891,024 | 6/1959 | Putnam | 260—83.7 X |
| 2,933,467 | 4/1960 | Borunsky | 260—27 |
| 2,961,420 | 11/1960 | Frey et al. | 260—27 |
| 3,306,743 | 2/1967 | Sanders | 260—27 X |

WILLIAM D. MARTIN, *Primary Examiner.*

M. LUSIGNAN, *Assistant Examiner.*

U.S. Cl. X.R.

117—161